United States Patent [19]
Fowler et al.

[11] Patent Number: 5,604,503
[45] Date of Patent: Feb. 18, 1997

[54] MULTIPATH AND CO-CHANNEL SIGNAL PREPROCESSOR

[75] Inventors: Mark L. Fowler, Ithaca; Steven V. Czarnecki, Apalachin, both of N.Y.

[73] Assignee: Lockheed Martin Corporation, Bethesda, Md.

[21] Appl. No.: 411,026

[22] Filed: Mar. 27, 1995

[51] Int. Cl.$^6$ .............................. G01S 3/16; G01S 13/00
[52] U.S. Cl. ...................... 342/378; 342/159; 342/194; 342/195; 364/516; 364/DIG. 1; 364/923.4
[58] Field of Search .................................... 342/194, 195, 342/381, 382, 384, 379, 378, 189, 159, 59; 364/516, 517, 923.4

[56] References Cited

U.S. PATENT DOCUMENTS

| | | | |
|---|---|---|---|
| 3,869,673 | 3/1975 | Close | 455/210 |
| 3,939,475 | 2/1976 | Lewis | 342/129 |
| 4,101,891 | 7/1978 | Jain | 342/25 |
| 4,449,127 | 5/1984 | Sanchez | 342/80 |
| 4,513,383 | 4/1985 | Hackett, Jr. | 364/517 |
| 5,230,076 | 7/1993 | Wilkinson | 455/62 |

Primary Examiner—Gregory C. Issing
Attorney, Agent, or Firm—William H. Steinberg

[57] ABSTRACT

A multipath signal preprocessor which permits coherent bistatic radar detection with a single omnidirectional antenna is provided. The multipath signal preprocessor separates multipath signals received at an antenna into a strong path signal and a weak path signal. The received multipath signal after filtering, amplifying, and heterodyning is separated into in-phase and quadrature signal components. A constant magnitude signal estimate having approximately the frequency and phase of the strong path signal from the multipath signal is generated. An estimate of the amplitude of the strong path signal is generated from the received multipath signal amplitude. The estimate of the amplitude of the strong path signal is multiplied by the constant magnitude signal estimate having approximately the frequency and phase of the strong path signal to obtain an estimate of the strong path signal. The estimate of the strong path signal is subtracted from the in-phase and quadrature signals to obtain difference signals which are estimates of the in-phase and quadrature components of the weak path signal. The estimates of the weak and strong path signals are supplied to a cross correlation processor to determine delay and doppler estimates.

14 Claims, 12 Drawing Sheets

601  /= Compute imaginary part of signal at C6 =/
602  Apply FIR Hilbert transform to ADC output samples
603  Store results as imaginary part of signal at C6
604  /= Compute real part of signal at C6 =/
605  Delay ADC output samples
606  Store results as real part of signal at C6
607  /= Now do Complex Digital Modulation =/
608  Compute complex exponential signal samples
609  Multiply each real/imaginary pair at C6 by the corresponding sample of the complex exponential
610  /= Now decimate by a factor of two =/
611  Keep 1st, 3rd, 5th, etc. samples computed in line 609; discard 2nd, 4th, 6th etc. samples
612  Store result for further processing

FIG. 8

5101 For each real/imaginary sample pair at point B5:
5102    Mag = square root of [ (real squared) + (imag squared) ]

FIG. 9

5201 For each sample index:
5202    Obtain block of computed magnitudes
5203    Compute the average of the block
5204    Store result at currently indexed sample location at E5

FIG. 10

```
5301  For each real/imaginary sample pair at B5:
5302    IF corresponding magnitude sample is not zero:
5303      /= Process the real part =/
5304      Divide real sample by computed magnitude sample
5305      Store result as a real sample at D5
5306      /= Process the imaginary part =/
5307      Divide imag sample by computed magnitude sample
5308      Store result as an imaginary sample at D5
5309    /= Handle case when magnitude sample is zero =/
5310    ELSE
5311      Store real/imag sample pair unchanged at D5
```

FIG. 11A

| B5 | C5 | D5 |
|---|---|---|
| 1.0500 | 1.0500 | 1.0000 |
| 0.7928 + 0.6864i | 1.0486 | 0.7560 + 0.6545i |
| 0.1489 + 1.0339i | 1.0445 | 0.1426 + 0.9898i |
| -0.5620 + 0.8726i | 1.0380 | -0.5415 + 0.8407i |
| -0.9887 + 0.2861i | 1.0292 | -0.9606 + 0.2779i |
| -0.9229 - 0.4316i | 1.0188 | -0.9058 - 0.4236i |
| -0.4032 - 0.9231i | 1.0073 | -0.4002 - 0.9164i |
| 0.3061 - 0.9470i | 0.9952 | 0.3075 - 0.9515i |
| 0.8480 - 0.4979i | 0.9834 | 0.8624 - 0.5063i |
| 0.9532 + 0.1926i | 0.9725 | 0.9802 + 0.1980i |
| 0.5741 + 0.7733i | 0.9631 | 0.5961 + 0.8029i |
| -0.0921 + 0.9516i | 0.9560 | -0.0964 + 0.9953i |
| -0.7042 + 0.6399i | 0.9515 | -0.7401 + 0.6725i |
| -0.9500 + 0.0000i | 0.9500 | -1.0000 + 0.0000i |
| -0.7042 - 0.6399i | 0.9515 | -0.7401 - 0.6725i |
| -0.0921 - 0.9516i | 0.9560 | -0.0964 - 0.9953i |
| 0.5741 - 0.7733i | 0.9631 | 0.5961 - 0.8029i |
| 0.9532 - 0.1926i | 0.9725 | 0.9802 - 0.1980i |
| 0.8480 + 0.4979i | 0.9834 | 0.8624 + 0.5063i |
| 0.3061 + 0.9470i | 0.9952 | 0.3075 + 0.9515i |
| -0.4032 + 0.9231i | 1.0073 | -0.4002 + 0.9164i |
| -0.9229 + 0.4316i | 1.0188 | -0.9058 + 0.4236i |
| -0.9887 - 0.2861i | 1.0292 | -0.9606 - 0.2779i |
| -0.5620 - 0.8726i | 1.0380 | -0.5415 - 0.8407i |
| 0.1489 - 1.0339i | 1.0445 | 0.1426 - 0.9898i |
| 0.7928 - 0.6864i | 1.0486 | 0.7560 - 0.6545i |
| 1.0500 - 0.0000i | 1.0500 | 1.0000 - 0.0000i |
| 0.7928 + 0.6864i | 1.0486 | 0.7560 + 0.6545i |
| 0.1489 + 1.0339i | 1.0445 | 0.1426 + 0.9898i |
| -0.5620 + 0.8726i | 1.0380 | -0.5415 + 0.8407i |
| -0.9887 + 0.2861i | 1.0292 | -0.9606 + 0.2779i |
| -0.9229 - 0.4316i | 1.0188 | -0.9058 - 0.4236i |
| -0.4032 - 0.9231i | 1.0073 | -0.4002 - 0.9164i |
| 0.3061 - 0.9470i | 0.9952 | 0.3075 - 0.9515i |
| 0.8480 - 0.4979i | 0.9834 | 0.8624 - 0.5063i |
| 0.9532 + 0.1926i | 0.9725 | 0.9802 + 0.1980i |
| 0.5741 + 0.7733i | 0.9631 | 0.5961 + 0.8029i |
| -0.0921 + 0.9516i | 0.9560 | -0.0964 + 0.9953i |
| -0.7042 + 0.6399i | 0.9515 | -0.7401 + 0.6725i |
| -0.9500 + 0.0000i | 0.9500 | -1.0000 + 0.0000i |

FIG. 11B

| E5 | F5 | G5 |
|---|---|---|
| 1.0006 | 1.0006 | 0.0494 |
| 1.0006 | 0.7565 + 0.6549i | 0.0363 + 0.0314i |
| 1.0006 | 0.1427 + 0.9904i | 0.0063 + 0.0435i |
| 1.0006 | -0.5418 + 0.8412i | -0.0202 + 0.0314i |
| 1.0006 | -0.9612 + 0.2781i | -0.0275 + 0.0080i |
| 1.0006 | -0.9064 - 0.4239i | -0.0165 - 0.0077i |
| 1.0006 | -0.4005 - 0.9170i | -0.0027 - 0.0061i |
| 1.0006 | 0.3077 - 0.9521i | -0.0017 + 0.0051i |
| 1.0006 | 0.8629 - 0.5066i | -0.0149 + 0.0087i |
| 1.0006 | 0.9808 + 0.1981i | -0.0276 - 0.0056i |
| 1.0006 | 0.5964 + 0.8034i | -0.0223 - 0.0301i |
| 1.0006 | -0.0964 + 0.9960i | 0.0043 - 0.0444i |
| 1.0006 | -0.7406 + 0.6729i | 0.0363 - 0.0330i |
| 1.0006 | -1.0006 + 0.0000i | 0.0506 - 0.0000i |
| 1.0006 | -0.7406 - 0.6729i | 0.0363 + 0.0330i |
| 1.0006 | -0.0964 - 0.9960i | 0.0043 + 0.0444i |
| 1.0006 | 0.5964 - 0.8034i | -0.0223 + 0.0301i |
| 1.0006 | 0.9808 - 0.1981i | -0.0276 + 0.0056i |
| 1.0006 | 0.8629 + 0.5066i | -0.0149 - 0.0087i |
| 1.0006 | 0.3077 + 0.9521i | -0.0017 - 0.0051i |
| 1.0006 | -0.4005 + 0.9170i | -0.0027 + 0.0061i |
| 1.0006 | -0.9064 + 0.4239i | -0.0165 + 0.0077i |
| 1.0006 | -0.9612 - 0.2781i | -0.0275 - 0.0080i |
| 1.0006 | -0.5418 - 0.8412i | -0.0202 - 0.0314i |
| 1.0006 | 0.1427 - 0.9904i | 0.0063 - 0.0435i |
| 1.0006 | 0.7565 - 0.6549i | 0.0363 - 0.0314i |
| 1.0006 | 1.0006 - 0.0000i | 0.0494 - 0.0000i |
| 1.0006 | 0.7565 + 0.6549i | 0.0363 + 0.0314i |
| 1.0006 | 0.1427 + 0.9904i | 0.0063 + 0.0435i |
| 1.0006 | -0.5418 + 0.8412i | -0.0202 + 0.0314i |
| 1.0006 | -0.9612 + 0.2781i | -0.0275 + 0.0080i |
| 1.0006 | -0.9064 - 0.4239i | -0.0165 - 0.0077i |
| 1.0006 | -0.4005 - 0.9170i | -0.0027 - 0.0061i |
| 1.0006 | 0.3077 - 0.9521i | -0.0017 + 0.0051i |
| 1.0006 | 0.8629 - 0.5066i | -0.0149 + 0.0087i |
| 1.0006 | 0.9808 + 0.1981i | -0.0276 - 0.0056i |
| 1.0006 | 0.5964 + 0.8034i | -0.0223 - 0.0301i |
| 1.0006 | -0.0964 + 0.9960i | 0.0043 - 0.0444i |
| 1.0006 | -0.7406 + 0.6729i | 0.0363 - 0.0330i |
| 1.0006 | -1.0006 + 0.0000i | 0.0506 - 0.0000i |

FIG. 11C

| T-P CS | D-P CS |
|---|---|
| 0.0500 | 1.0000 |
| 0.0443 + 0.0232i | 0.7485 + 0.6631i |
| 0.0284 + 0.0411i | 0.1205 + 0.9927i |
| 0.0060 + 0.0496i | -0.5681 + 0.8230i |
| -0.0177 + 0.0468i | -0.9709 + 0.2393i |
| -0.0374 + 0.0332i | -0.8855 - 0.4647i |
| -0.0485 + 0.0120i | -0.3546 - 0.9350i |
| -0.0485 - 0.0120i | 0.3546 - 0.9350i |
| -0.0374 - 0.0332i | 0.8855 - 0.4647i |
| -0.0177 - 0.0468i | 0.9709 + 0.2393i |
| 0.0060 - 0.0496i | 0.5681 + 0.8230i |
| 0.0284 - 0.0411i | -0.1205 + 0.9927i |
| 0.0443 - 0.0232i | -0.7485 + 0.6631i |
| 0.0500 - 0.0000i | -1.0000 + 0.0000i |
| 0.0443 + 0.0232i | -0.7485 - 0.6631i |
| 0.0284 + 0.0411i | -0.1205 - 0.9927i |
| 0.0060 + 0.0496i | 0.5681 - 0.8230i |
| -0.0177 + 0.0468i | 0.9709 - 0.2393i |
| -0.0374 + 0.0332i | 0.8855 + 0.4647i |
| -0.0485 + 0.0120i | 0.3546 + 0.9350i |
| -0.0485 - 0.0120i | -0.3546 + 0.9350i |
| -0.0374 - 0.0332i | -0.8855 + 0.4647i |
| -0.0177 - 0.0468i | -0.9709 - 0.2393i |
| 0.0060 - 0.0496i | -0.5681 - 0.8230i |
| 0.0284 - 0.0411i | 0.1205 - 0.9927i |
| 0.0443 - 0.0232i | 0.7485 - 0.6631i |
| 0.0500 - 0.0000i | 1.0000 - 0.0000i |
| 0.0443 + 0.0232i | 0.7485 + 0.6631i |
| 0.0284 + 0.0411i | 0.1205 + 0.9927i |
| 0.0060 + 0.0496i | -0.5681 + 0.8230i |
| -0.0177 + 0.0468i | -0.9709 + 0.2393i |
| -0.0374 + 0.0332i | -0.8855 - 0.4647i |
| -0.0485 + 0.0120i | -0.3546 - 0.9350i |
| -0.0485 - 0.0120i | 0.3546 - 0.9350i |
| -0.0374 - 0.0332i | 0.8855 - 0.4647i |
| -0.0177 - 0.0468i | 0.9709 + 0.2393i |
| 0.0060 - 0.0496i | 0.5681 + 0.8230i |
| 0.0284 - 0.0411i | -0.1205 + 0.9927i |
| 0.0443 - 0.0232i | -0.7485 + 0.6631i |
| 0.0500 - 0.0000i | -1.0000 + 0.0000i |

FIG. 11D

| (T-P CS) - G5 | (D-P CS) - F5 |
|---|---|
| 0.0006 | -0.0006 |
| 0.0080 - 0.0082i | -0.0080 + 0.0082i |
| 0.0221 - 0.0023i | -0.0221 + 0.0023i |
| 0.0262 + 0.0182i | -0.0262 - 0.0182i |
| 0.0098 + 0.0388i | -0.0098 - 0.0388i |
| -0.0209 + 0.0409i | 0.0209 - 0.0409i |
| -0.0459 + 0.0181i | 0.0459 - 0.0181i |
| -0.0469 - 0.0171i | 0.0469 + 0.0171i |
| -0.0226 - 0.0419i | 0.0226 + 0.0419i |
| 0.0099 - 0.0412i | -0.0099 + 0.0412i |
| 0.0284 - 0.0196i | -0.0284 + 0.0196i |
| 0.0241 + 0.0032i | -0.0241 - 0.0032i |
| 0.0079 + 0.0098i | -0.0079 - 0.0098i |
| -0.0006 + 0.0000i | 0.0006 - 0.0000i |
| 0.0079 - 0.0098i | -0.0079 + 0.0098i |
| 0.0241 - 0.0032i | -0.0241 + 0.0032i |
| 0.0284 + 0.0196i | -0.0284 - 0.0196i |
| 0.0099 + 0.0412i | -0.0099 - 0.0412i |
| -0.0226 + 0.0419i | 0.0226 - 0.0419i |
| -0.0469 + 0.0171i | 0.0469 - 0.0171i |
| -0.0459 - 0.0181i | 0.0459 + 0.0181i |
| -0.0209 - 0.0409i | 0.0209 + 0.0409i |
| 0.0098 - 0.0388i | -0.0098 + 0.0388i |
| 0.0262 - 0.0182i | -0.0262 + 0.0182i |
| 0.0221 + 0.0023i | -0.0221 - 0.0023i |
| 0.0080 + 0.0082i | -0.0080 - 0.0082i |
| 0.0006 + 0.0000i | -0.0006 - 0.0000i |
| 0.0080 - 0.0082i | -0.0080 + 0.0082i |
| 0.0221 - 0.0023i | -0.0221 + 0.0023i |
| 0.0262 + 0.0182i | -0.0262 - 0.0182i |
| 0.0098 + 0.0388i | -0.0098 - 0.0388i |
| -0.0209 + 0.0409i | 0.0209 - 0.0409i |
| -0.0459 + 0.0181i | 0.0459 - 0.0181i |
| -0.0469 - 0.0171i | 0.0469 + 0.0171i |
| -0.0226 - 0.0419i | 0.0226 + 0.0419i |
| 0.0099 - 0.0412i | -0.0099 + 0.0412i |
| 0.0284 - 0.0196i | -0.0284 + 0.0196i |
| 0.0241 + 0.0032i | -0.0241 - 0.0032i |
| 0.0079 + 0.0098i | -0.0079 - 0.0098i |
| -0.0006 + 0.0000i | 0.0006 - 0.0000i |

FIG. 12

Approximate Relative SNRs for BRSP (All Results Hold For Input D-P SNR > 10 dB)

| Input T-P SNR | LOSS in Output T-P SNR | GAIN in Output D-P SNR |
|---|---|---|
| -40 dB | 3.0 dB | 3.0 dB |
| -30 dB | 3.0 dB | 3.0 dB |
| -20 dB | 3.1 dB | 2.9 dB |
| -10 dB | 3.3 dB | 2.5 dB |
| 0 dB | 4.8 dB | 0.0 dB |

5,604,503

MULTIPATH AND CO-CHANNEL SIGNAL PREPROCESSOR

This invention was made with Government support under a contract awarded by the US Navy. The Government has certain rights in this invention.

BACKGROUND OF THE INVENTION

The present invention relates to an apparatus and method of separating multipath and co-channel signals received at an antenna into a strong path signal and a weak path signal and more particularly in one aspect to a bistatic radar signal preprocessor.

Figure 1:
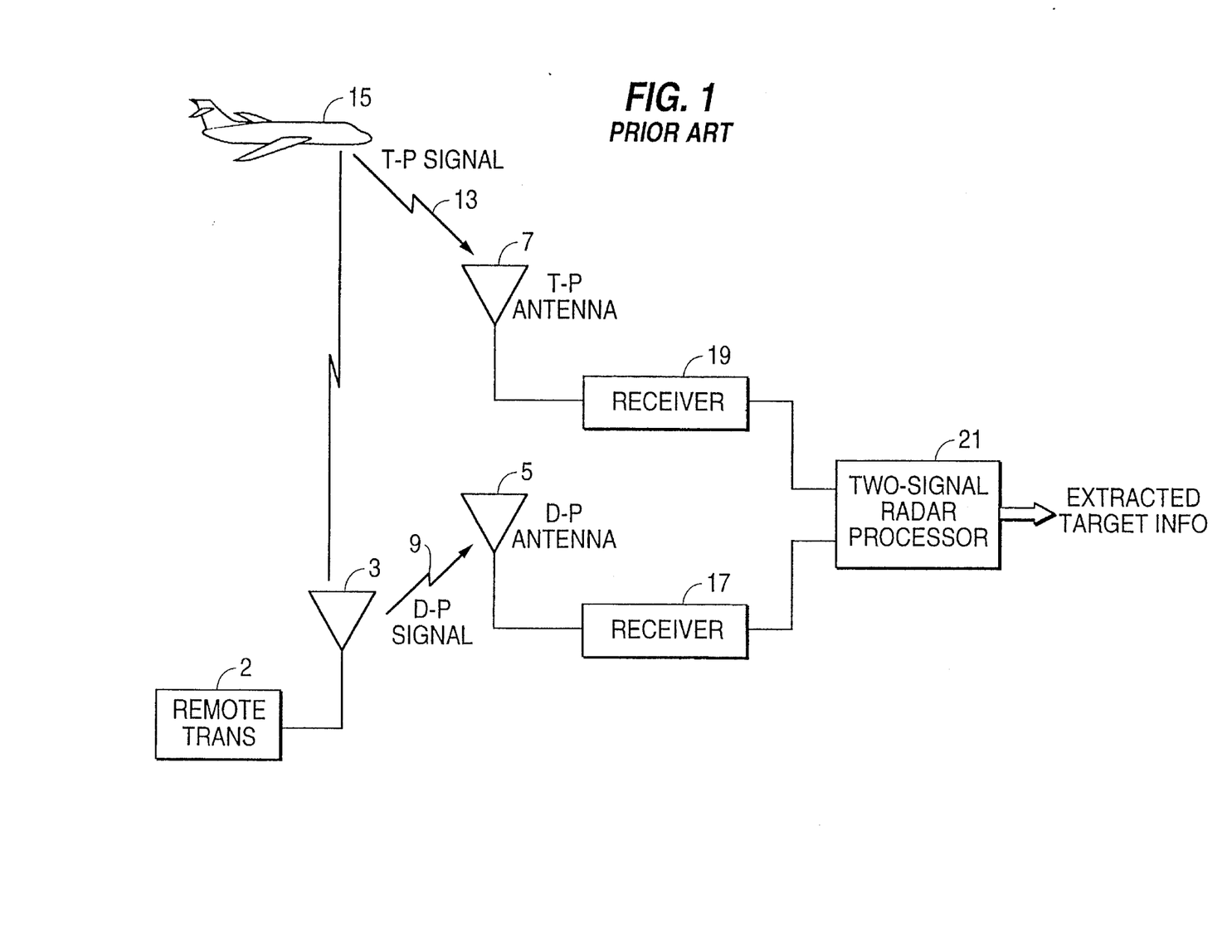
FIG. 1 is a schematic representation in block diagram form of a prior art bistatic radar system with two directional receiving antennas.

As shown in FIG. 1, bistatic radar is radar in which the remote transmitter 2, which includes a transmitting antenna 3, is separated from receiving antennas 5 and 7. A coherent bistatic radar uses two separate signals to compute information about the range and velocity of a target 15: (1) a signal called a direct-path or D-P signal 9 received directly from a transmitter 2, and (2) a version of the transmitted signal called the target-path or T-P signal 13 that has been reflected from some target 15 of interest. Because signals 9 and 13 occupy the same frequency region, conventional bistatic radar systems receive them separately using two directional antennas 5 and 7, respectively, designed to receive signals from a limited region of space. Directional antennas are used since the target path antenna 7 can never accept signals coming from near the transmitter 3. Antennas 5 and 7 feed two separate receivers 17 and 19. The output of the receivers is connected to a two-signal radar processor 21 for extracting target information. The requirement of two directional antennas precludes use on platforms that can support only a single small antenna such as submarines or on a small platform that is required to be highly mobile such as a jeep or man-pack.

It is an object of the present invention to provide multipath and co-channel signal detection using a single receiving antenna.

It is a further object of the present invention to provide a apparatus and a method of performing multipath and co-channel signal detection with a single omnidirectional antenna providing 360 degrees of surveillance.

SUMMARY OF THE INVENTION

In one aspect of the present invention a multipath signal is received at an antenna and processed to obtain two separate signals, which are referred to as a strong path signal and a weak path signal. The signals can result from a signal which is received directly from a transmitter, referred to as a strong path signal, and a signal which is reflected from an object before being received at the antenna, referred to as a weak path signal. To separate the signals received at a single antenna, the multipath signal is provided to a receiver to be amplified and heterodyned. The resulting signal is changed to its complex form by separating it into its in-phase and quadrature components. The in-phase and quadrature components are equivalent to the complex exponential form representation of the signal. An estimate of the amplitude of the received multipath signal is obtained by combining the in-phase and quadrature components. The amplitude fluctuations of the complex signal represented by its in-phase and quadrature components are removed by dividing the in-phase and quadrature components by the estimate of the amplitude fluctuations of the multipath signal to obtain a normalized strong path signal. An estimate of the amplitude of the strong path signal is obtained by smoothing the amplitude of the multipath signal to obtain an estimate of the amplitude of the strong path signal. Multiplying the normalized strong path signal by the estimated amplitude of the strong path signal gives an estimate of the strong path signal. Subtracting the estimate of the strong path signal from the received multipath signal provides an estimate of the weak path signal.

BRIEF DESCRIPTION OF THE DRAWING

FIGS. 11A, 11B, 11C, and 11D show values at different nodes for a simple example of processing using the block diagram of FIG. 5.

DETAILED DESCRIPTION OF THE INVENTION

Figure 2:
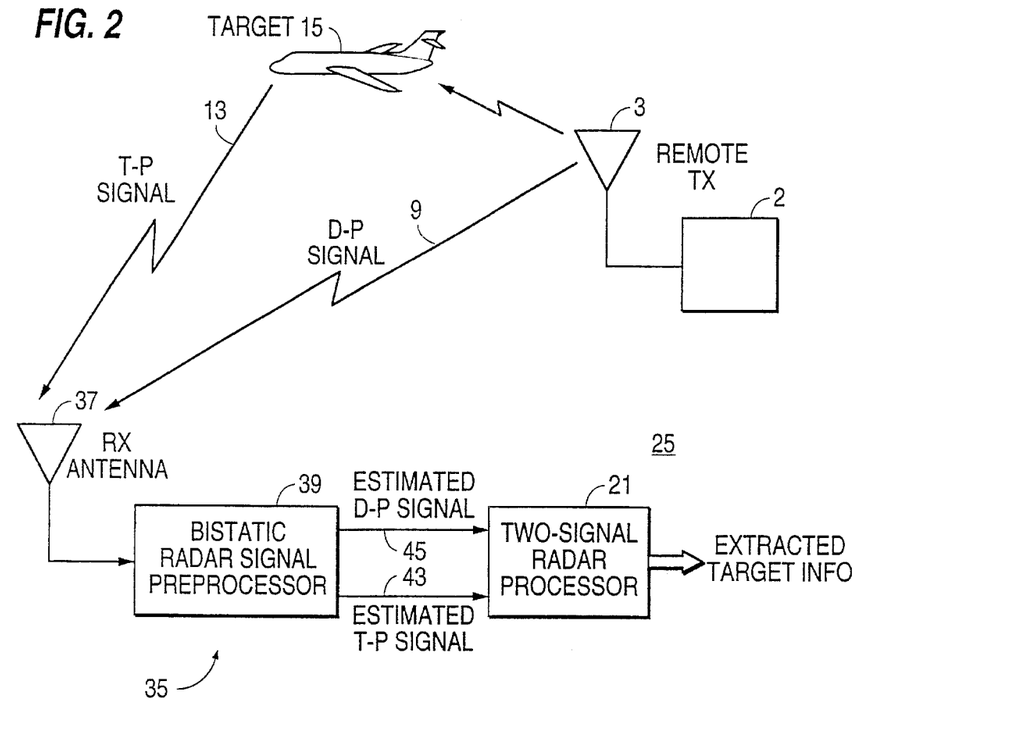
FIG. 2 is a schematic representation in block diagram form of a bistatic radar system in accordance with the present invention.

Referring now to the drawing wherein like elements are indicated by like reference numerals throughout, and more particularly FIG. 2 thereof, a bistatic radar system 25 and target 15 are shown. The bistatic radar system includes a remote transmitter 2, with an antenna 3, and a bistatic radar receiver 35 with an omnidirectional antenna 37, a bistatic radar signal processor 39, and a two-signal radar processor 21. The transmitter 2 is located some distance from an omnidirectional receiving antenna 37. The remote antenna 3 electromagnetically radiates a signal into the environment. Part of this radiation propagates directly to the bistatic radar receiver 35 where it is collected by the omnidirectional antenna 37. The signal received at the omnidirectional antenna 37 that was transmitted directly from the remote antenna 3 is referred to as the direct path or D-P signal 9. Part of the energy radiating from the transmitter 3 impinges on one or more targets 15 of interest and is then reflected towards the bistatic radar receiver 35 where it also is collected by the omnidirectional antenna 37. The reflected signal received at the omnidirectional antennal is referred to as a target path or T-P signal 13. The impingement on one or more of the targets 15 imparts characteristics to the T-P signal that can be exploited to gain information about target parameters such as range and velocity. For example, when the T-P signal 13 exhibits a time delay with respect to the D-P signal 9 which occurs due to the longer propagation path of the T-P signal, the delay provides information regarding a target's range from the bistatic radar receive antenna. Also, when the T-P signal exhibits a frequency shift with respect to the D-P signal this provides information regarding a target's rate of motion with respect to the bistatic radar receiver antenna.

The bistatic radar signal preprocessor (BRSP) 39 accepts the composite signal collected by the receive antenna 37 and provides estimates of the T-P and D-P signals 9 and 13, respectively. The outputs of the BRSP 39 can then be used in exactly the same way that the separately received signals of a two-antenna bistatic radar are used in FIG. 1 in the two-signal radar processor 21. The outputs of the BRSP 43 and 45 are applied to the two-signal radar processor 21, which detects the presence of targets and extracts target information that has been imparted to the T-P signal.

Figure 3:
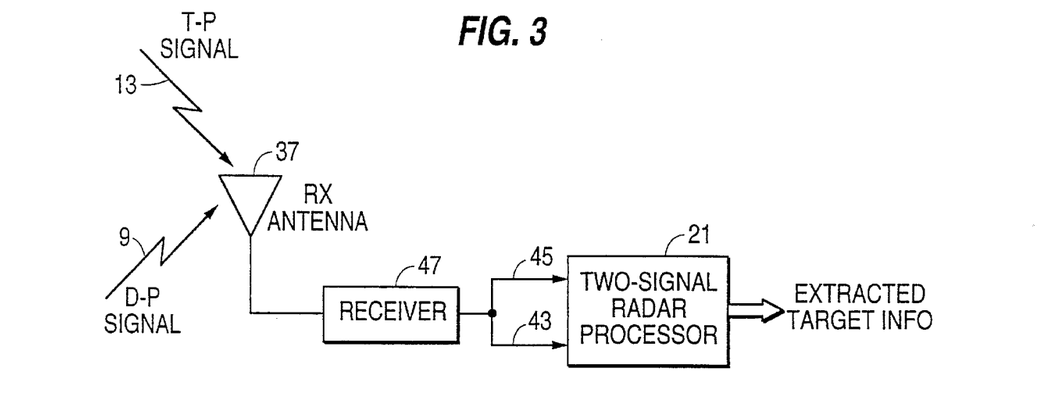
FIG. 3 is a schematic representation in block diagram form of bistatic radar system having a single antenna and not using the bistatic radar signal preprocessor shown in FIG. 2.

A system using a single omnidirectional antenna and not using the BRSP 39 of FIG. 2 is shown in FIG. 3. The bistatic receiver in FIG. 3 includes an omnidirectional receiving antenna 37 for receiving a T-P and D-P signal, 9 and 13, respectively. Antenna 37 is connected to a receiver 47 which provides the composite signal to both inputs of a two-signal radar processor 21. The composite signal from the receiver is used as an estimate of the D-P signal 45 and as an estimate of the T-P signal 43. The composite signal is a fairly good estimate of the D-P signal, since the strong D-P signal dominates the weak T-P signal. Unfortunately, the composite signal is a very poor estimate of the T-P signal, since it is dominated by the D-P signal. Hence, neither of the signals presented to the two-signal radar processor provides high quality information about the target or targets. Therefore, the performance of this "auto-processing" method is much worse than that of a two-antenna system. Consider, for example, that the two-signal radar processor implements correlation processing, where the performance is measured by the ratio of signal power to noise power after processing, or signal-to-noise ratio (SNR). Under typical bistatic radar operating scenarios, the SNR of this auto-processing method will be more than 20 dB worse (i.e., more than 100 times worse) than the SNR for a comparable two-antenna system.

Figure 4:
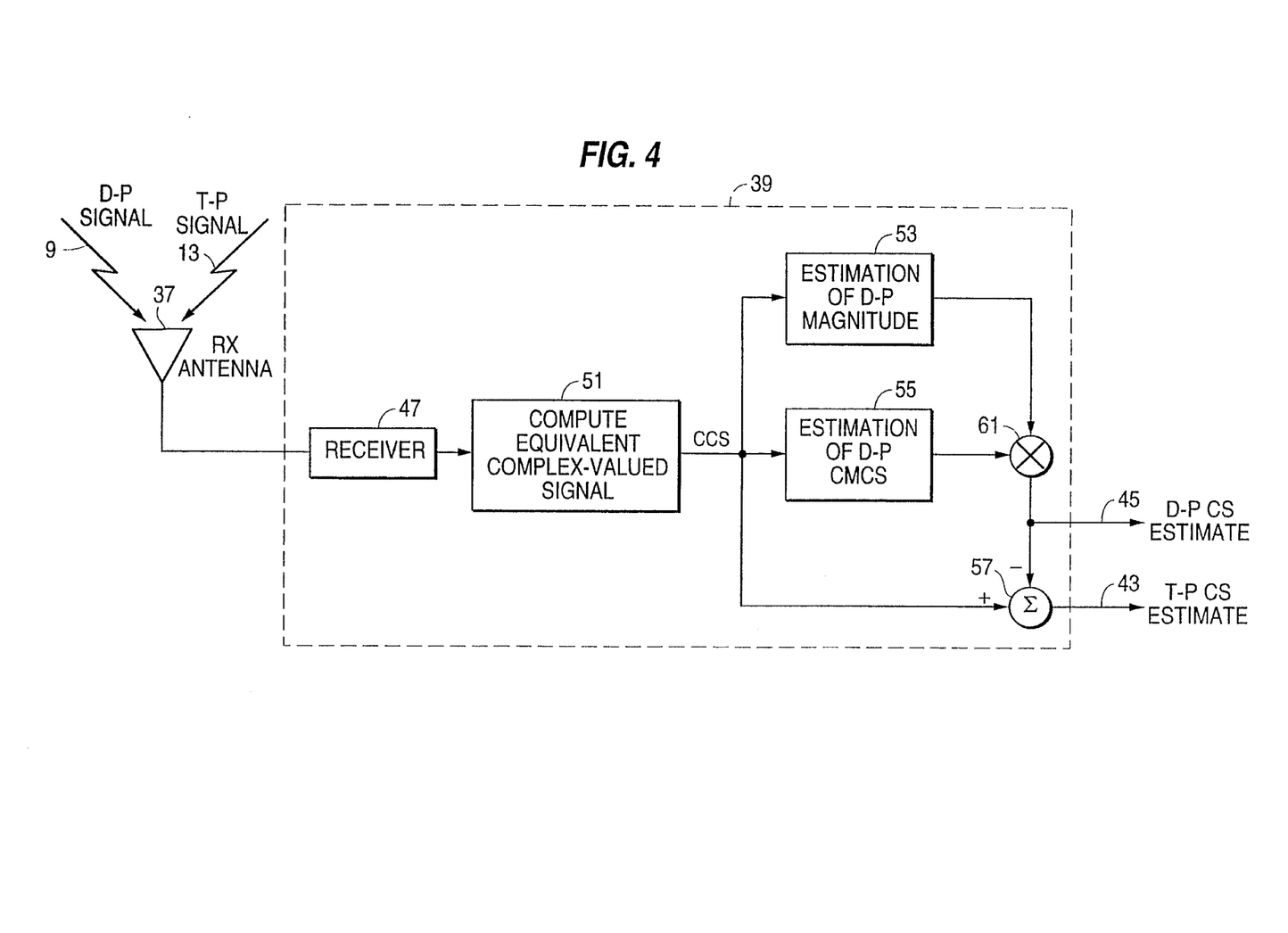
FIG. 4 is a schematic representation in block diagram form of a bistatic radar signal preprocessor of FIG. 2 shown in more detail.

Referring now to FIG. 4, the bistatic radar signal preprocessor 39 of FIG. 2 is shown in more detail. The BRSP includes a receiver 47 connected to a block 51 for computing the equivalent complex-valued signal. The output of block 47 is connected to block 53 which performs an estimation of the D-P magnitude and to block 55 which provides an estimation of the D-P constant-magnitude complex-valued signal (CMCS). The output of the block 51 is also provided to the noninverting input of a summer 57. The outputs of blocks 53 and 55 are provided to multiplier 61 and the output of multiplier 61 is connected to the inverting input of summer 57. In operation, the antenna signal which is the composite of the D-P signal and the T-P signal, is applied to the input of receiver 47. The receiver filters, amplifies, and heterodynes the composite signal and provides the result to the input of compute equivalent complex-valued signal block 51. Block 51 computes a complex-valued signal that uniquely represents the composite signal that is at the output of the receiver 47. This complex-valued signal will be referred to as the composite complex-valued signal (CCS). The CCS contains the sum of the T-P equivalent complex-valued signal (T-P CS) and the D-P equivalent complex-valued signal (D-P CS). Each of these complex-valued signals can be described in terms of the instant-by-instant product of a time-varying magnitude signal and a constant-magnitude complex-valued signal (CMCS).

The estimation of the D-P CS 45 is accomplished as follows. An estimate of the D-P CMCS is obtained by processing the CCS in block 55. Also, the CCS is used to compute a time-varying estimate of the magnitude of the D-P CS in block 53. This estimated magnitude is multiplied by the estimate of the D-P CMCS on an instant-by-instant basis in multiplier 61 to yield an estimate of the D-P CS, which is available at the output of multiplier 61.

Since the CCS at the output of the compute equivalent complex-valued signal block 51 includes the sum of the D-P CS and the T-P CS, subtracting the estimate of the D-P CS from the CCS in summer 57 provides an estimate of the T-P CS at the output of summer 57.

Estimates of the D-P and T-P signals have been extracted and are available for further bistatic radar processing as required. In particular, the estimated T-P CS and the estimated D-P CS are passed to the two-signal radar processing block 21 shown in FIG. 2, where the target information can be extracted.

The BRSP 39 provides improved performance compared to the auto-processing technique described above and shown in FIG. 3 by providing improved estimates of the D-P and T-P signals to the two-signal radar processor 21. In particular, the major improvement is in the estimated T-P signal: the estimate's characteristics are dominated by the true T-P signal's characteristics, since the dominance of the D-P signal is removed by subtracting a good estimate of the D-P signal from the composite signal.

Figure 5:
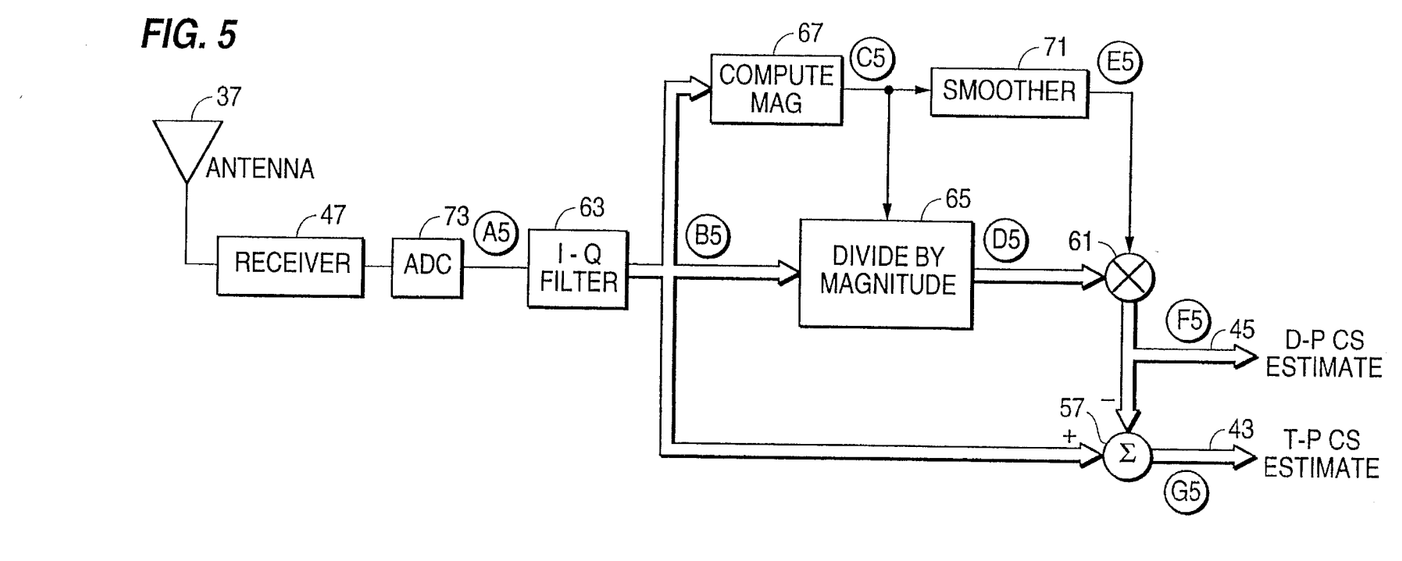
FIG. 5 is a schematic representation in block diagram form of a digital embodiment of FIG. 4.

A more detailed representation of the bistatic radar signal preprocessor is shown in FIG. 5 and includes the antenna 37, and several elements that combine to function as the BRSP 39. The BRSP includes a receiver 47. The antenna 37 and receiver 47 function to collect the signals and to convert them into a form suitable for processing by the remaining elements of the BRSP.

The BRSP is configured to provide estimates of the D-P equivalent complex signal (D-P CS) and the T-P equivalent complex signal (T-P CS) as follows. An I-Q filter block 63 implements the function of the compute equivalent complex-valued signal block 51 shown in FIG. 4 and described in the previous section. A divide by magnitude block 65 together with compute magnitude block 67 estimates the D-P CMCS as carried out by block 55 in FIG. 4 discussed above. A smoother block 71 together with the compute magnitude block 67 estimate the D-P magnitude. Detailed descriptions of the implementation and interconnection of these elements will be given below. The multiplier 61 and summer 57 in FIG. 5 are as described above for FIG. 4.

The single antenna 37 is required to collect the composite of the D-P signal and the T-P signal. It may be of any type suited to the signals to be received and need not be directional as required in a two-antenna bistatic radar system.

The receiver 47 accepts the signal received by the antenna and converts it into a form suitable for processing by the remaining elements of the BRSP. The receiver includes filters, amplifiers, and mixers. The filters remove stray energy collected by the antenna that are outside of the frequency band in which the T-P signal and D-P signal reside. The amplifiers in the receiver boost the received signal to the power level required by the other BRSP elements. The mixers shift the frequency spectrum of the composite signal so that its center frequency is located at one quarter of the sampling frequency of an analog-to-digital converter (ADC) 73 connected to the output of the receiver 47.

The ADC 73 provides at its output, digital samples of the signal at its input. These samples are uniformly spaced in time and are taken at a sufficiently high sampling rate to provide an accurate representation of the signals of interest.

The I-Q Filter 63 takes the signal samples from the ADC 73 and converts them into the real and imaginary components of complex-valued signal equivalent to the real-valued signal at the output of the ADC 73. The resulting complex-valued signal is provided to the input of compute magnitude block 67, divide by magnitude block 65, and the noninverting input of summer 57. In FIG. 5 double-line arrows are used to represent signal paths for complex-valued signals, whereas single-line arrows represent signal paths for real-valued signals.

Figure 6:
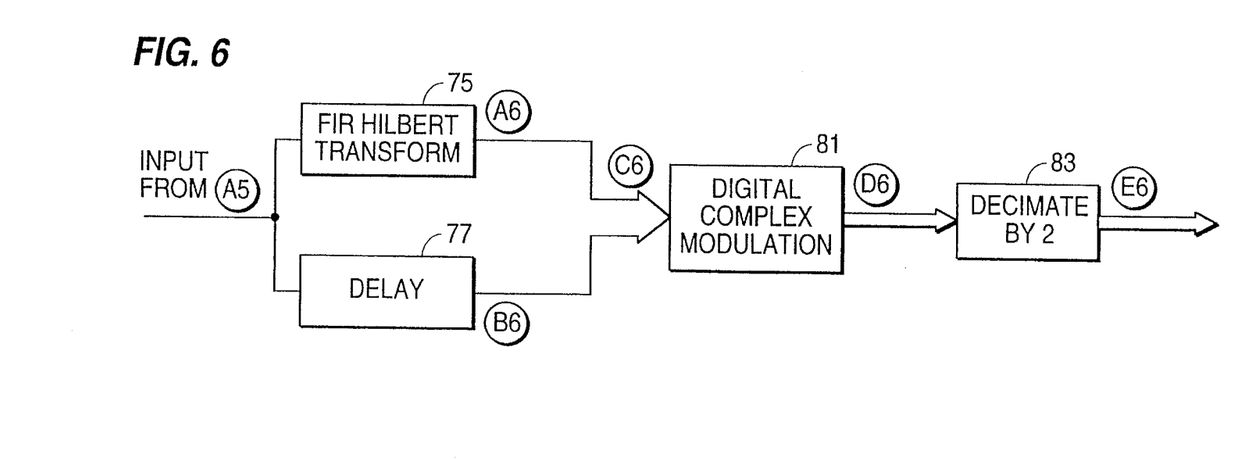
FIG. 6 is a schematic representation in block diagram form of the I-Q filter of FIG. 5.

The real and imaginary component at the output of the I-Q filter which is labelled point B5 are determined as shown in FIG. 6 described in more detail, hereinafter.

Figure 8:
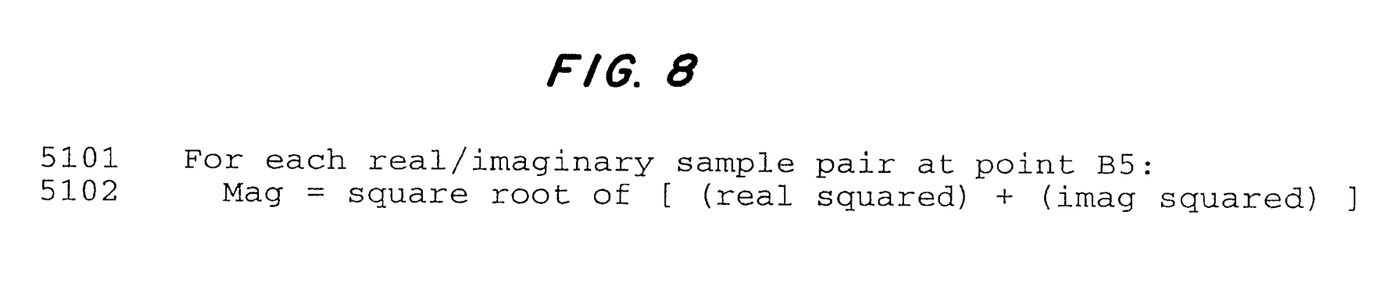
FIG. 8 shows pseudocode for the compute magnitude block of FIG. 5.

The compute magnitude block 67 in FIG. 5 takes the real and imaginary components at B5 and computes its sample-by-sample magnitude component. The output consists of real-valued samples at C5. This is implemented as follows: add the square of each real component sample at B5 to the square of the corresponding imaginary component sample at B5, and then take the square root of each of the sums. The pseudocode for the compute magnitude block of FIG. 5 is shown in FIG. 8.

Figure 9:
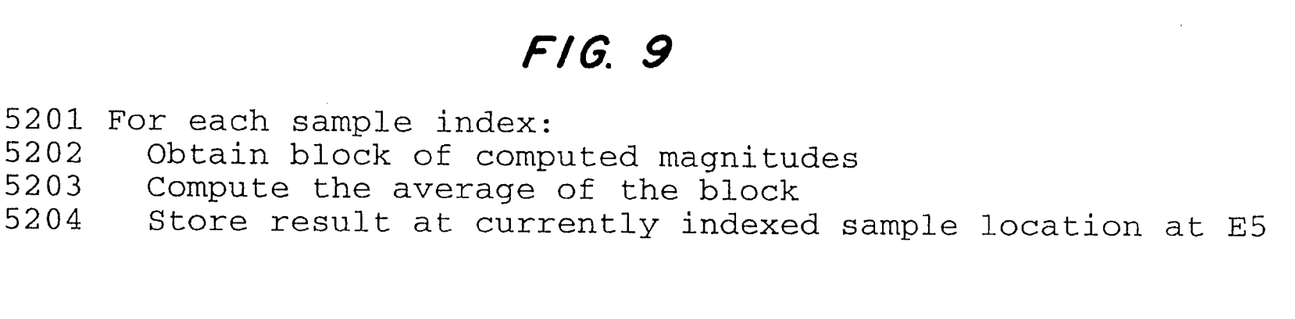
FIG. 9 shows pseudocode for the smoother block of FIG. 5.

Smoother block 71 uses the computed magnitude samples to provide a sample-by-sample estimate of the magnitude of the D-P complex-valued signal. Each sample provided at the output of the smoother block is computed by averaging over a suitable set of computed magnitude samples at the input to the smoother block. There are many different ways to define the set over which the average is computed; in general the set may contain magnitude samples taken from each side of the index of the sample of interest, and may depend on the value of the index of the sample of interest. The pseudocode for smoother block 71 is shown in FIG. 9.

The preferred implementation of the smoother depends on being able to identify regions of time during which the amplitude of the direct-path signal d(t) is suitably constant while the phase of the target-path signal s(t) undergoes at least one complete cycle through an angle of $2\pi$. Note that this region of time need not consist entirely of consecutive time samples; an example of this case is when d(t) is a quadrature amplitude modulation (QAM) signal. Such a region will be referred to as a constant amplitude region (CAR). The proper selection of the CAR is based on analysis of the characteristics of the expected signals and, in some cases, measurements taken during the operation of the system (as is done for the case of d(t) being a QAM signal).

Figure 10:
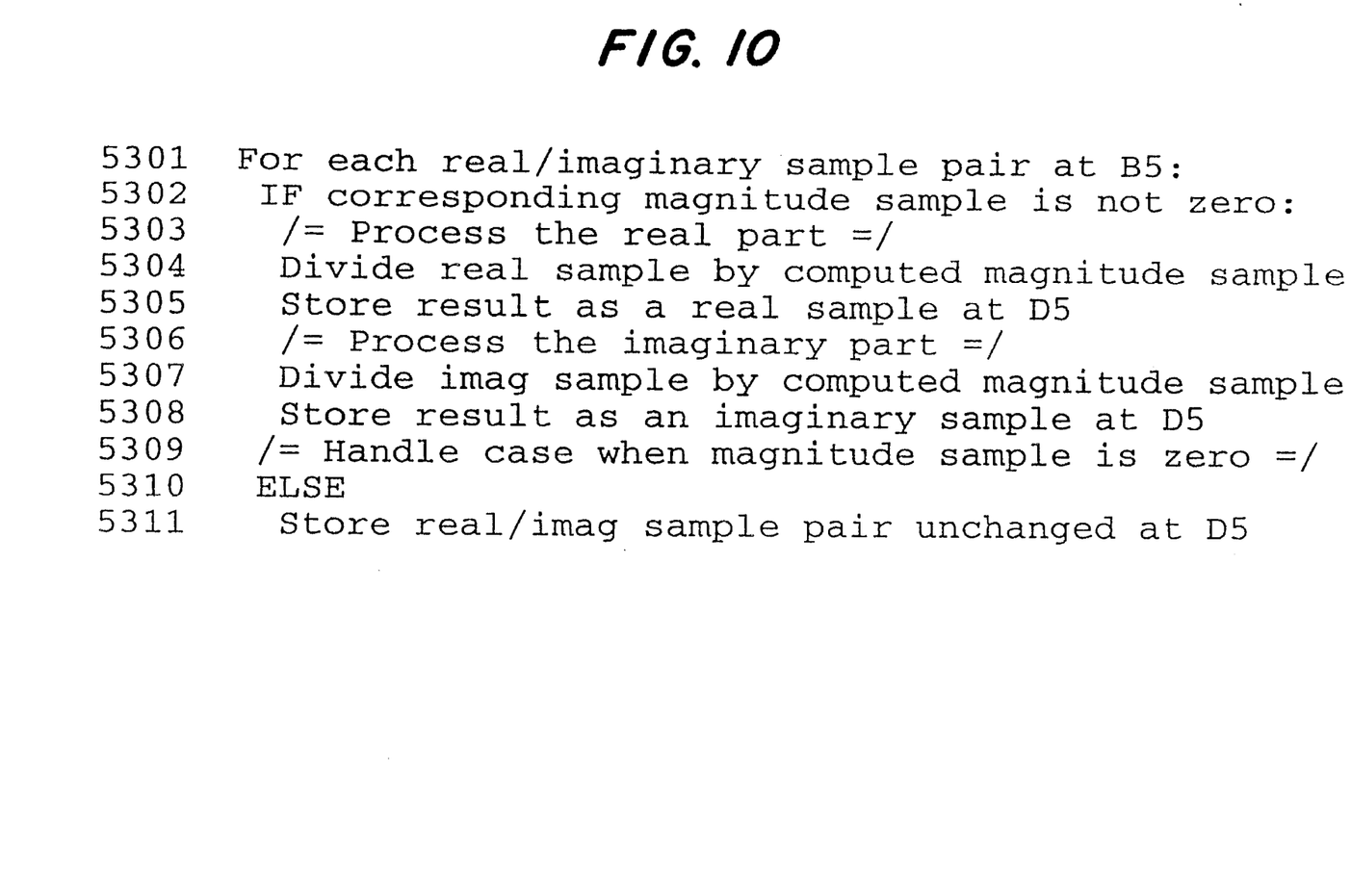
FIG. 10 shows pseudocode for the divide by magnitude block in FIG. 5.
Figure 11C:
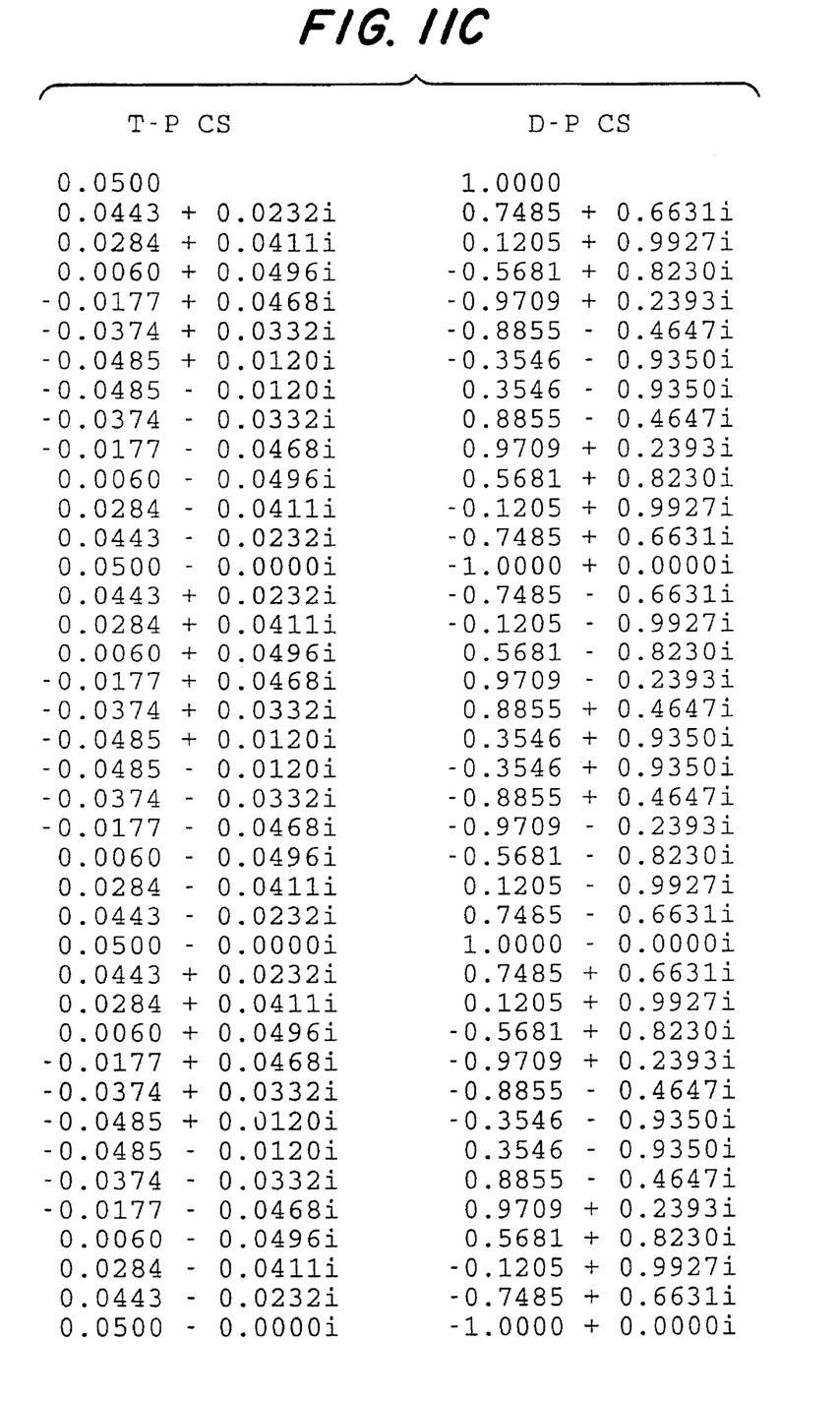
Figure 11D:
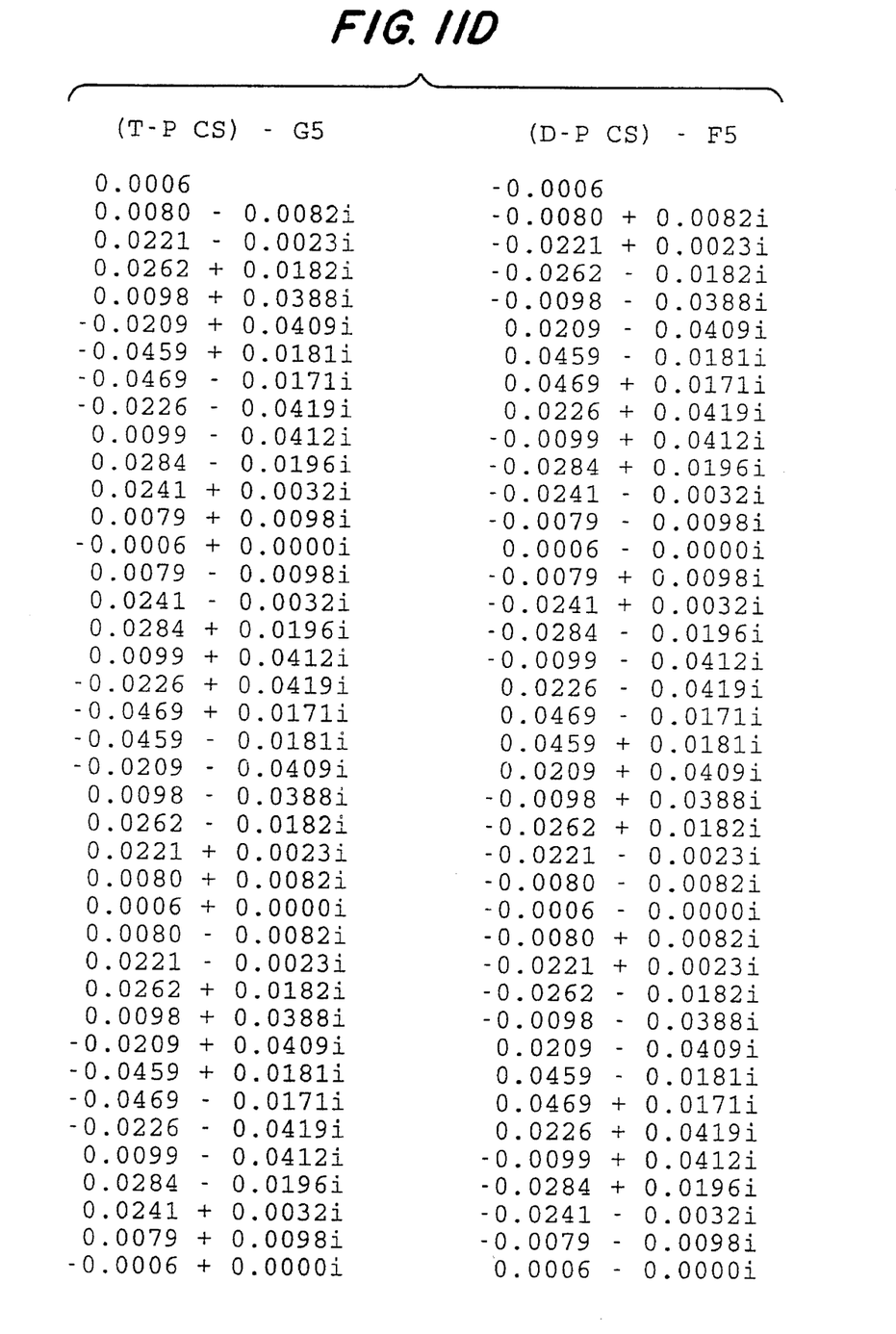

Divide by magnitude block 65 normalizes each real/ imaginary sample pair at B5 by dividing by the corresponding computed magnitude sample to provide a complex-valued signal having a constant magnitude at the output of the divide by magnitude block labelled as point D5. The constant magnitude signal at D5 is taken as the estimate of the constant magnitude component of the D-P complex-valued signal, as discussed in conjunction with FIG. 4. The pseudocode for the divide by magnitude block 65 is shown in FIG. 10.

The estimate of the complex-valued D-P signal (D-P CS) is now obtained by taking each real/imaginary sample pair at D5 and multiplying it by the corresponding sample available at the output of the smoother block 71, which is labelled E5. The resulting samples are stored at the output of multiplier 61 which is labelled F5. The estimate of the complex-valued T-P signal (T-P CS) is now obtained by subtracting each real/imaginary sample pair at F5 from each real/imaginary sample pair at B5 in summer 57. The resulting samples are stored at the output of the summer which is labelled as G5.

Figure 7:
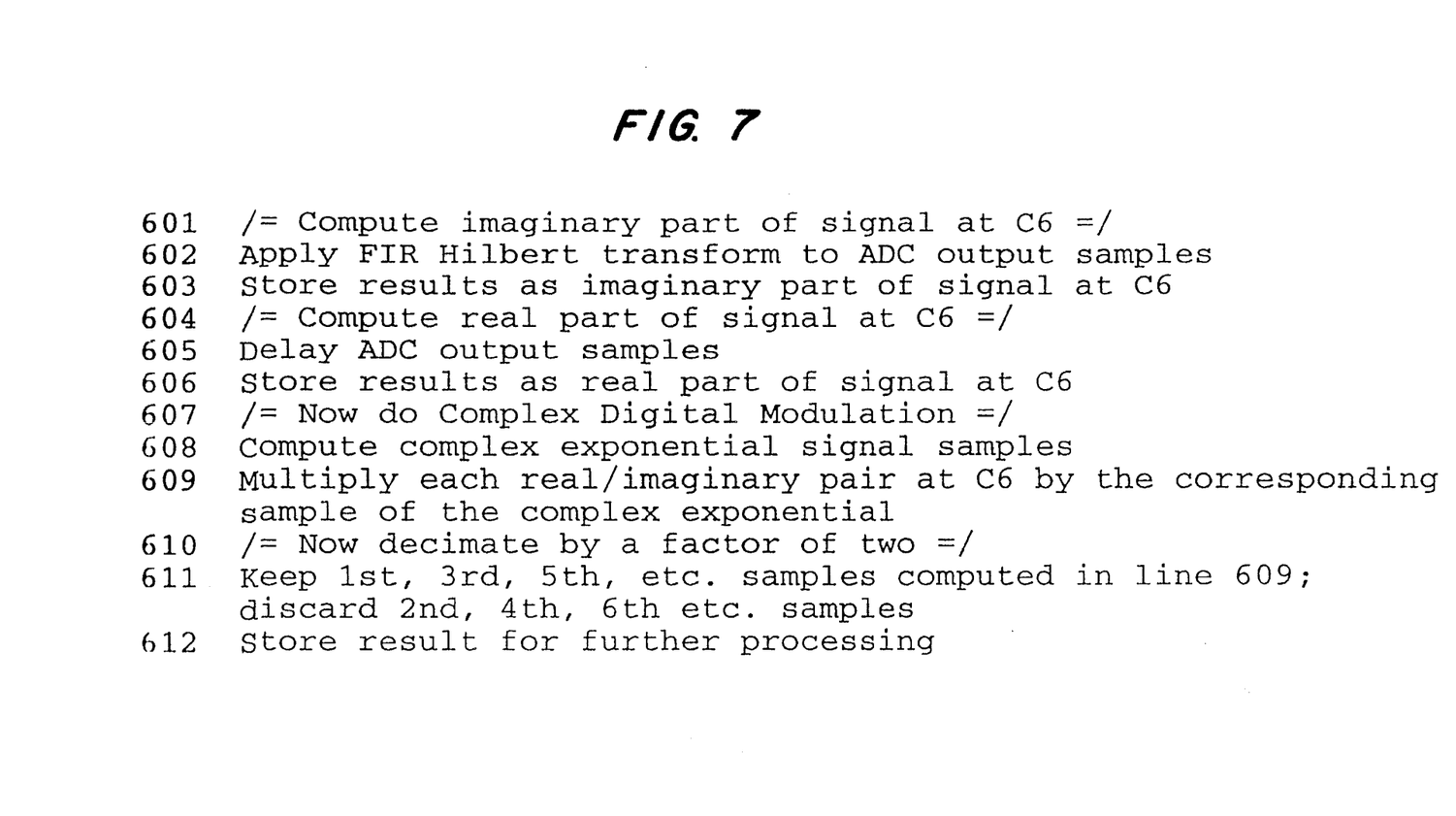
FIG. 7 shows pseudocode for the I-Q filter shown in FIG. 6.

Referring now to FIG. 6, the operation of the I-Q filter will now be described in more detail. The signal at point A5 of FIG. 5 is passed through a finite impulse response (FIR) digital Hilbert transform filter 75 to provide an output signal at a point labelled A6 in FIG. 6. The signal at point A5 of FIG. 5 is also passed through a digital delay 77 with delay equal to the delay imparted by the FIR Hilbert transform filter 75. The output of the digital delay is labelled point B6. The signals from the FIR Hilbert transform and the digital delay are combined and provided to a digital complex modulator. The input to the digital complex modulator is labelled point C6. The signal at A6 is the imaginary component of the signal at C6 and the signal at B6 is the real component. The signal at C6 is frequency shifted by the digital complex modulator 81 so that its spectrum is centered at DC via digital complex modulation by multiplying by samples of a complex exponential signal having frequency of one quarter the sampling frequency. The output of the digital complex modulator is labelled D6. The resulting signal at point D6 is then decimated by a factor of two in the decimate by two block 83. For example, keep 1st, 3rd, 5th, etc. samples and discard 2nd, 4th, 6th etc. samples. Pseudocode for I-Q filter is shown in FIG. 7.

THEORY OF OPERATION

The RF signal obtained from a single antenna after it is output from the receiver is the sum of a direct path signal d(t), a target-path signal s(t) and noise n(t):

$$r(t)=d(t)+s(t)+n(t) \qquad (1)$$

The bistatic radar signal preprocessor is used to extract estimates of direct and target path signals, $d_e(t)$ and $s_e(t)$, respectively. These estimates can then be cross correlated to give estimates of the bistatic delay and doppler of the targets, which provide information about the range and velocity of the targets. The bistatic radar preprocessor takes advantage of the fact that the direct-path signal is the strongest of the three signals and the phase of the received signal r(t) is approximately that of the direct path signal. The received signal is nothing more than the direct-path signal with a small envelope disturbance and a small phase disturbance. The processing strips off the envelope fluctuations of the received signal to provide a rough estimate $d_e(t)$ of the direct-path signal. This estimate has a constant envelope and a phase that approximates that of the direct-path signal. An estimate of the target path signal $s_e(t)$ is then obtained as follows. A time-varying scale factor A(t) is determined and used to compute the estimate of the target-path as follows:

$$s_e(t)=r(t)-A(t)d_e(t) \qquad (2)$$

where A(t) is computed so as to optimally cancel the component of d(t) in r(t). The two estimates can then be provided to a cross correlation block. At the input to the I-Q filter r(t) is in the form shown below in equation 3.

$$r(t)=E(t)\cos(\omega t+\phi(t)) \quad (3)$$

where E(t) is the envelope of the signal.

The output of the I-Q filter $r_c(t)$ is in the form shown below in equation 4.

$$r_c(t)=E(t)\exp\{j(\omega+\phi(t))\} \quad (4)$$

The output of the divide by magnitude block 65 is $d_e(t)$ which is shown in equation 5.

$$d_e(t)=\exp\{j(\omega+\phi(t))\} \quad (5)$$

The output of the smoother block 71 is a scale factor A(t). The output of the multiplier provides an estimate of the D-P CS in the form $A(t)d_e(t)$. In simulations it has been observed that there is little difference between passing $A(t)d_e(t)$ or $d_e(t)$ to the cross correlator. The multiplication still needs to be performed and the scale factor generated in order to arrive at the estimate of the T-P signal.

The actual processing of the smoother is performed on a "CAR-by-CAR" basis as follows. Consider that we have all of the samples of $r_c(t)$ as defined in equation 4 that reside in a particular CAR. This grouping of samples is applied to divide-by-magnitude block 65 in FIG. 5 to provide the corresponding samples of $d_e(t)$ as defined in equation 5. When the multi-path signal preprocessor is being used as a bistatic radar pre-processor, the preferred implementation of the smoother computes a constant K that minimizes the sum $$\sum_k |r_c(k) - K d_e(k)|, \quad (6)$$

where the sum is over all the samples in a particular CAR; this choice is preferred for this application because it minimizes the peak on the cross-correlation surface that is located at zero delay and zero doppler. The solution of this minimization problem yields $$K = \frac{1}{N} \sum_k E(k), \quad (7)$$

where E(k) represents the samples that reside in the particular CAR of the amplitude of the signal $r_c(t)$ as shown in equation 4 and is the output of the block labeled 67 in FIG. 5, and N is the number of samples in the CAR. Note that the value of K is computed by finding the average of E(k). This value of K is used as the value of the A(t), the time varying scale factor, for all times within the CAR, and is multiplied by all the corresponding samples of $d_e(t)$ that are in the CAR; these samples are available at the output of the block labeled 65 in FIG. 5. This process is repeated for each identified CAR.

Consider two examples that illustrate the choice of CAR using familiar signals taken from broadcasting. Example 1: when d(t) and s(t) are both broadcast FM signals, the amplitude of d(t) is a constant and therefore any time interval long enough to ensure that the phase of s(t) has gone through at least one cycle is suitable for use as a CAR; a lower bound on the duration of this interval can be determined by performing an engineering analysis of the FM modulation due to voice and music; an upper bound on the length of the CAR is generally set by constraints of limited computer memory available and a desire to process the data in real-time. Example 2: when d(t) is a broadcast AM signal and s(t) is a broadcast FM signal, engineering analyses of voice and music signals can allow one to determine an appropriate duration during which the amplitude of the AM signal will remain suitably constant and the phase of the FM signal will go through at least one complete cycle; again, any interval of this duration can be used as a CAR. Similar analyses for other pairings of signal types can be done.

In each of these two examples the CAR was defined as any collection of consecutive signal samples spanning a suitably determined duration; during operation of the invention for the two examples above, sequentially arriving signal samples are grouped into consecutive blocks having this duration, and each of these resulting CAR blocks is processed as was described above. However, this technique must be modified when d(t) is a digital QAM signal, whose amplitude is constrained to have one of several distinct values. For this case the samples of the received signal r(t) given in equation 1 are first processed by standard QAM demodulation techniques, which allow the identification of multiple time intervals during which the received QAM signal has the same amplitude level. This information is used to group samples of s(t) from many noncontiguous intervals into a single CAR. One CAR would be determined for each allowable amplitude level of the QAM signal.

A definition of the class of signals to which the technique of the present invention can be successfully applied is two signals which can be expressed mathematically by $$s_1(t)=m_1(t)\cos(\omega_c t+\phi_1(t)) \quad (8)$$

$$s_2(t)=m_2(t)\cos(\omega_c t+\phi_2(t)) \quad (9)$$

In general, the following conditions must hold:

a. The two signals must be sufficiently separated in received power (10 dB or more separation has been sufficient in simulations). We will assume that $s_1(t)$ is the stronger of the two.

b. The phase $\phi_2(t)$ of the weaker signal must change rapidly with respect to the amplitude $m_1(t)$ of the stronger signal. At a minimum, $m_2(t)$ should remain nearly constant during the time it takes $\phi_2(t)$ to cycle through a range of $2\pi$.

For the case of multipath processing (i.e., two signals originating from a single transmitter), examples include but are not limited to: FM signals (this includes FM communication signals as well as pulse-compression radar signals), and many varieties of digital communication signals (including PSK, FSK, and their variations). Digital quadrature amplitude modulation (QAM) signals are also useable, assuming that special techniques are used to implement the smoother as discussed previously. It is possible that some SSB signals may also satisfy the requirements. Examples of signals for which the multipath processing method will not work are conventional AM signals and DSB signals.

For the case of co-channel processing (i.e., two signals originating from two distinct transmitters), many acceptable combinations are possible; in general, the weak signal should have a varying phase $\phi_2(t)$. Therefore, AM and DSB signals are not acceptable as weak signals; a SSB signal might qualify as an acceptable weak signal depending on the strong signal. Examples include, but are not limited to: any pairing of two of the following: FM, PSK, FSK, QAM or pulse-compression radar; a strong AM, DSB, or SSB signal with a weak FM, PSK, FSK, QAM or pulse-compression radar signal; a strong AM, DSB, SSB, FM, PSK, FSK, or pulse-compression radar signal with a weak SSB signal. Again, the case of a strong QAM signal can be handled by properly implementing the smoother operation.

In summary, the operation in FIG. 5 is as follows. Group the output of I-Q filter block 63 into appropriate CARs. For each identified CAR compute magnitude of all samples in CAR in block 67. Divide all samples in CAR by corresponding output of block 67 in block 65. Compute average of output of block 67 in block 71, with a single number output per CAR. Multiply output of block 71 by each sample at the output of block 65 in multiplier 61. Subtract output of multiplier 61 from the output samples of block 63 that are in the current CAR in summer 57.

EXAMPLE OF OPERATION

A simple example of the operation of the apparatus and method as shown in FIG. 5 is given in FIGS. 11A–11D. This example shows the operation from point B5 onward, since the operation of the elements prior to that point is known to those skilled in the art. The column headings above the example data given below indicate the point on FIG. 5 where the data was collected. The data shown for the signal at point B5 consists of 40 samples of the sum of two complex sinusoids: one with unit amplitude and one with amplitude of 0.05; the data is shown in real plus imaginary form. The second column shows the computed magnitude of the signal at B5; notice that the magnitude exhibits a ripple. The data at D5 has constant magnitude and is an estimate of D-P CMCS. For this example, each sample of the output of the smoother block 71 was set to the average over the entire length of the signal at C5. The signal at F5 is an estimate of the D-P CS, which is shown in the table for comparison. Similarly, the signal at G5 is an estimate of the T-P CS, which also is included for comparison.

The performance of the BRSP was determined through analysis, simulation, and prototype evaluation. The measure of performance was the ratio of signal power to noise power (SNR). The SNRs of interest are defined as follows. The signal at point B5 in FIG. 5 consists of three parts: the T-P signal, the D-P signal, and extraneous noise. The ratio of the T-P signal's power to the noise power at this point is called the "T-P SNR", and, similarly, the ratio of the D-P signal's power to the noise power is called the "D-P SNR"; collectively, these two SNRs are called the "Input SNRs". The signal at point F5 consists of the true D-P signal plus some noise, and the signal at point G5 consists of the true T-P signal plus some noise. The SNRs at these two points will be called, respectively, the "Output D-P SNR" and the "Output T-P SNR", or collectively the "Output SNRs". The effectiveness of the BRSP was evaluated by comparing the two Output SNRs to their respective Input SNRs.

Figure 12:
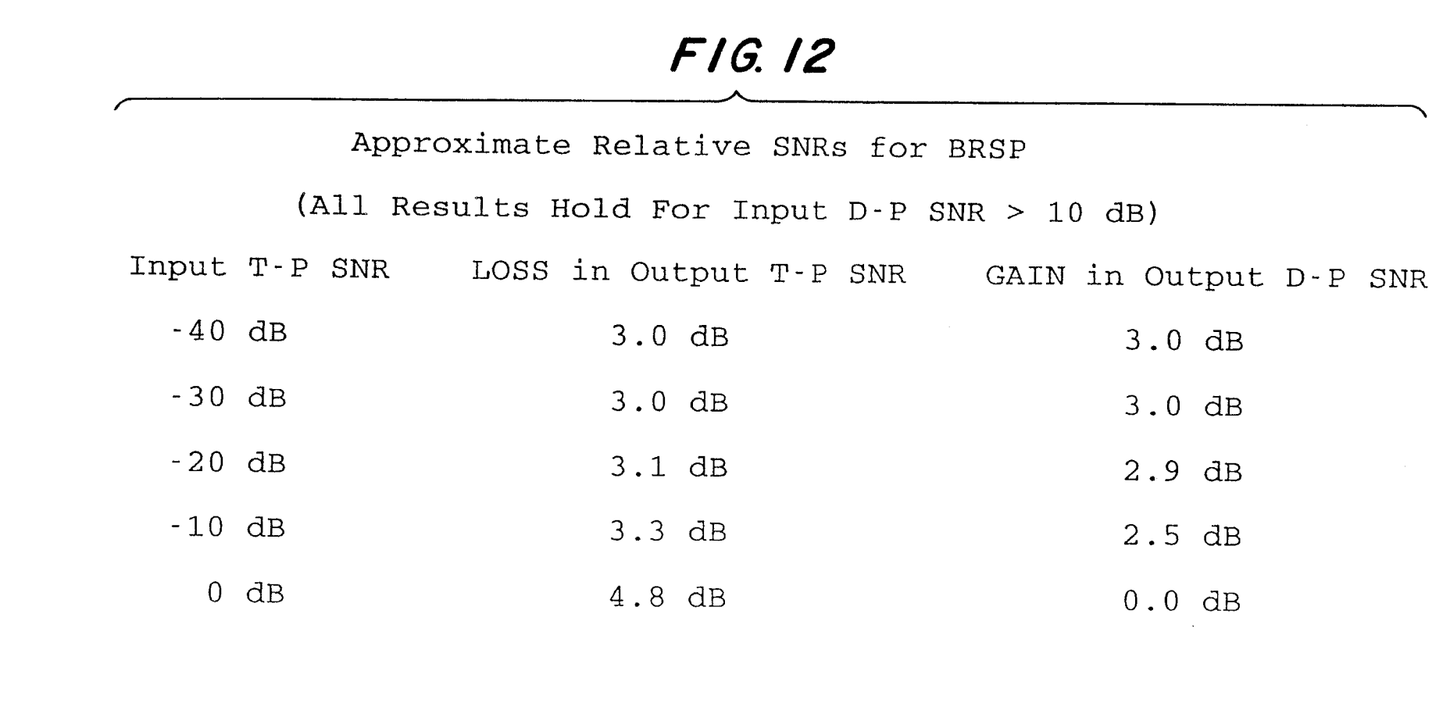
FIG. 12 shows the approximate relative signal to noise ratios for bistatic radar signal preprocessor (BRSP) for an input direct path signal to noise ratio of greater than 10 dB.

It was determined that the Output D-P SNR was between 0 dB and 3 dB better than the Input D-P SNR; this indicates that the processing done to obtain the D-P estimate could also be applied to a two-antenna system to improve its measurement of the D-P signal. It was also determined that the Output T-P SNR was only 3 to 5 dB worse than the Input T-P SNR over the region of input SNRs of interest. As shown in the table of FIG. 12, the losses remain fairly constant at close to the minimum loss of 3 dB until the Input T-P SNR approaches 0 dB (where the larger loss is more easily tolerated).

Implementations other than that given in FIG. 5 are possible; namely, it is possible to modify the particular elements or relationships between the elements, it is possible to improve the performance by adding additional elements, and it is possible to entirely or partially implement the BRSP using analog techniques.

There is room for many modifications to the basic digital implementation. The I-Q filter described above is just one way to convert the real-valued signal at A5 into an equivalent complex-valued signal with other available digital and analog techniques. Analog techniques would require putting the analog to digital converter after the I-Q filter.

The divide by magnitude block 65 can be replaced by the following. From the real and imaginary components at B5, compute the phase angle by taking the arctangent of the ratio of imaginary part to the real part. Then the signal at D5 can be computed by using this computed phase angle as the argument of a complex exponential. In particular, for each sample index k, compute $$P(k) = \text{atan}\left[(Im\{B5(k)\})/(Re\{B5(k)\})\right] \quad (9)$$

and then form $$D5(k) = \exp\{jP(k)\} \quad (10)$$

where B5(k) is the $k^{th}$ sample at point B5 and
D5(k) is the $k^{th}$ sample at point D5

It is also possible to estimate the D-P magnitude at E5 by computing the cross-correlation of the signal at D5 with the signal at B5, or by choosing a constant value for the signal at E5, say the value is A, that has been determined by minimizing a measure of the error between the signal at B5 and A times the signal at D5.

The signal at D5 can be used as the estimate of the D-P CS, instead of the signal at F5. Although, this does not provide as accurate an estimate, it can, in some situations, be suitable.

The estimate at D5 can be improved by applying it to a phase-lock loop (PLL) or other phase estimation technique. This could be done using digital or analog means. Alternatively, the phase angle computed using equation 9 could be digitally filtered to remove phase errors, and the result could then be used as the argument of the complex exponential in equation 10 to provide an improved estimate at D5.

In some circumstances it can be desirable to cascade multiple BRSPs together. This could be helpful in extracting several components from a received signal consisting of more than two multipath signals. In this situation the weak signal obtained from the first BRSP is used as a multipath input signal to a second BRSP, with the resulting weak signal from the second BRSP used as multipath signal in a subsequent BRSP until all the multipath signals are separated. The cascaded configuration provides not only the desired signal but a characterization of the multipath environment. This could be useful in a variety of imaging problems found in the radar, medical and communication fields.

Any or all of the implementation elements discussed above could be implemented in analog form. Analog filters can be used for the I-Q filter and the smoother; linear electronic components can be used to implement the summer used to subtract the signal at F5 from the signal at B5; nonlinear electronic components can be used to implement compute magnitude and divide by magnitude blocks as well as the multiplier that multiplies the signal at E5 by the signal at D5.

The BRSP can be used in other applications besides separating two signals that are multipath versions of a common signal transmitted from a remote location, the BRSP can also be used to separate two co-channel signals (i.e., signals occupying the same frequency region) that originated from two distinct transmitters. One example of this application are two radio transmitters operating on the same frequency where the signal received from one is much weaker than from the other transmitter. If a signal of interest (e.g. a communication signal) is corrupted by weaker signal (e.g., another communication signal) the BRSP could be used to extract either or both signals: the effect of the weak signal is suppressed in the estimate of the strong signal, and the weak signal estimate is not dominated by strong signal. Thus, if the strong signal is of interest and the weak signal is an interference, the strong signal estimate is an improved version of the desired signal; if the weak signal is also of interest (perhaps a weak radio station that is desired to be received) then the weak signal estimate can be processed further. The demodulated output of a standard radio would provide the message carried by the stronger of the two signals. However, application of our invention would provide estimates of each of these two radio signals. Demodulation of these two estimated signals would provide the message signals carried by each of the two signals. Thus, the invention would allow reception of weak radio signals that would otherwise be unreceivable due to strong co-channel radio transmissions.

A special case of this occurs when the interfering signal is a version of the signal of interest that has been delayed due to taking a secondary path of propagation. Applying the BRSP to this multipath situation would improve the reception of the stronger desired signal. The weaker signal could also be extracted and used in further processing: it could be correlated with the estimate of the strong signal to provide insight into the source of the multipath reflection.

Another example of separating two co-channel signals that originated from two distinct transmitters is a jammer purposely interfering with a radio or radar signal. Application of the invention can allow separation of the composite signal into an estimate of the radio/radar signal and an estimate of jamming signal. The latter estimate could potentially be used to determine information about the jammer (e.g. location, type, etc).

Many variations exist for implementation of the smoother block 71, especially when the bistatic radar signal preprocessor is used with other types of signals. For example, when the strong signal has a constant amplitude for all time (e.g., FM, PSK, FSK, etc.) the duration of a constant amplitude region (CAR) block is usually limited by the hardware's available memory space. In this case it is possible to overcome this limitation by incorporating information from past CARs into the computation of the current scale factor K. For example, let the average of E(k) over the $n^{th}$ CAR be denoted by $E_n$, and let the first computed scale factor be denoted by $K_1 = E_1$. Then the computation of the $n^{th}$ scale factor $K_n$ is given by $$K_n = \lambda K_{n-1} + E_n, \quad (11)$$

where $0 < \lambda < 1$. This has the effect of including averages over past CARs, but discounts their importance as they move farther into the past. A similar technique could be done for QAM where a recursire computation like this is done for each allowable level of the QAM amplitude.

Also, the averaging technique defined in equation 7 could be replaced by a general digital low pass filter, either an FIR (finite impulse response) or an IIR (infinite impulse response) implementation could be used. It is also possible to replace the arithmetic average used in equation 7 by a geometric average; this was found to provide a better Output T-P SNR, but resulted in poorer performance when the T-P and D-P estimates were cross-correlated.

The foregoing has described a preprocessor which allows the separation of weak and strong signals. The foregoing has also described a bistatic radar preprocessor which permits coherent bistatic radar detection to be performed with a single omnidirectional antenna.

While the invention has been particularly shown and described with reference to several embodiments thereof, it will be understood by the those skilled in the art that various changes in form and details may be made therein without departing from the spirit and scope of the invention.

What is claimed is:

1. A method of separating multipath signals received at an antenna into a strong path signal and a weak path signal, comprising the steps of:

amplifying the received multipath signal received at the antenna;

converting the amplified signal into in-phase and quadrature signal components;

generating a constant magnitude signal estimate having approximately the frequency and phase of the strong path signal from the multipath signal;

obtaining an estimate of the amplitude of the strong path signal from the received multipath signal amplitude;

multiplying the estimate of the amplitude of the strong path signal by the constant magnitude signal estimate of the strong path signal to obtain an estimate of the strong path signal; and subtracting the estimate of the strong path signal from the in-phase and quadrature signals to obtain difference signals which are estimates of the in-phase and quadrature components of the weak path signal.

2. The method of claim 1 wherein said step of generation of a constant magnitude signal estimate of the strong path signal from the in-phase and quadrature signals comprises the steps of:

combining the in-phase and quadrature signals to obtain a signal proportional to the amplitude of the received multipath signal; and normalizing the in-phase and quadrature signals using the amplitude of the received multipath signal to obtain a constant magnitude signal estimate having approximately the frequency and phase of the strong path signal.

3. The method of claim 2 wherein said step of generating a constant magnitude signal estimate having approximately the frequency and phase of the strong path signal from the multipath signal comprises the step of determining the time average over predetermined intervals of amplitude of the received multipath signal.

4. The method of claim 3 wherein the predetermined intervals are selected so that the magnitude of the strong path signal is sufficiently constant over each interval.

5. The method of claim 4 wherein the time average is selected on a block by block basis.

6. The method of claim 4 wherein the time average is selected on a sliding-window basis.

7. A method of performing coherent bistatic radar detection using a single omnidirectional antenna to receive signals comprising a strong path and a week path signal, comprising the steps of:

filtering, amplifying, and heterodyning signals received at the antenna;

separating the filtered, amplified, and heterodyned signals into in-phase and quadrature signal components;

generating a constant magnitude signal estimate having approximately the frequency and phase of the strong path signal from the received signals;

obtaining an estimate of the magnitude of the strong path signal from the received signals amplitude;

multiplying the estimate of the amplitude of the strong path signal by the constant magnitude signal estimate having approximately the frequency and phase of the strong path signal to obtain an estimate of the strong path signal;

subtracting the estimate of the strong path signal from the in-phase and quadrature signals to obtain difference signals which are estimates of the in-phase and quadrature components of the weak path signal; and providing the estimates of the weak and strong path signals to a cross correlation processor to determine delay and doppler estimates.

8. The method of claim 7 wherein said step of generating a constant magnitude signal estimate having approximately the frequency and phase of the strong path signal from the in-phase and quadrature signals comprises the steps of:

combining the in-phase and quadrature signals to obtain a signal representative to the magnitude of the received multipath signal; and normalizing the in-phase and quadrature signals using the amplitude of the received multipath signal and the signal representative to the magnitude to obtain a constant magnitude signal estimate having approximately the frequency and phase of the strong path signal.

9. The method of claim 8 wherein said step of generating a constant magnitude signal estimate having approximately the frequency and phase of the strong path signal from the multipath signal comprises the step of determining the time average over predetermined intervals of amplitude of the received multipath signal.

10. The method of claim 9 wherein the predetermined interval is selected so that the magnitude of the strong path signal is sufficiently constant over each interval.

11. The method of claim 10 wherein the time average is selected and performed on a block by block basis.

12. The method of claim 10 wherein the time average is selected and performed on a sliding-window basis.

13. A signal preprocessor for separating weak and strong signals occupying the same portion of the frequency spectrum and contained in a multipath signal received by an antenna and amplified by a receiver comprising:

means for generating in-phase and quadrature components from said amplified multipath signal;

signal processing means receiving the in-phase and quadrature components and generating a signal representative of the magnitude of the multipath signal;

amplitude fluctuation removing means receiving the in-phase and quadrature components and providing a constant magnitude estimate having approximately the frequency and phase of the strong signal;

means for estimating the magnitude of the strong signal responsive to the magnitude of the in-phase and quadrature components by determining the time average of the signal representative of the magnitude of the in-phase and quadrature components;

multiplying means receiving the estimate of the magnitude of the strong signal and the estimate having approximately the frequency and phase of the strong signal and providing a product of the two signals which is representative of the strong signal; and subtraction means receiving the in-phase and quadrature components and the product of the magnitude of the strong signal and the estimate having approximately the frequency and phase of the strong signal and providing a difference signal representative of the estimate of the weak signal.

14. A method of separating multipath signals received at an antenna into a strong path signal and a weak path signal, comprising the steps of:

amplifying the received multipath signal received at the antenna;

converting the amplified signal into in-phase and quadrature signal components to provide a complex exponential representation of the signal;

generating a normalized strong path signal by dividing the in-phase and quadrature components by an estimate of the amplitude fluctuation of the multipath signal;

obtaining an estimate of the amplitude of the strong path signal by combining the in-phase and quadrature components;

multiplying the estimate of the amplitude of the strong path signal by the normalized strong path signal to obtain an estimate of the strong path signal; and subtracting the estimate of the strong path signal from the in-phase and quadrature signals to obtain difference signals which are estimates of the in-phase and quadrature components of weak path signal.

* * * * *